US012776549B2

(12) United States Patent
Fukuda et al.

(10) Patent No.: US 12,776,549 B2
(45) Date of Patent: Oct. 27, 2026

(54) SEALING BODY FOR CYLINDRICAL STORAGE BATTERY AND CYLINDRICAL STORAGE BATTERY USING SAME

(71) Applicant: FDK CORPORATION, Tokyo (JP)

(72) Inventors: Yusuke Fukuda, Tokyo (JP); Hiroyuki Shibaoka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 612 days.

(21) Appl. No.: 18/271,664

(22) PCT Filed: Dec. 13, 2021

(86) PCT No.: PCT/JP2021/045794
§ 371 (c)(1),
(2) Date: Jul. 10, 2023

(87) PCT Pub. No.: WO2022/158164
PCT Pub. Date: Jul. 28, 2022

(65) Prior Publication Data

US 2024/0313333 A1 Sep. 19, 2024

(30) Foreign Application Priority Data

Jan. 19, 2021 (JP) ................................ 2021-006338

(51) Int. Cl.
*H01M 50/325* (2021.01)
*H01M 50/107* (2021.01)
(Continued)

(52) U.S. Cl.
CPC ....... *H01M 50/325* (2021.01); *H01M 50/107* (2021.01); *H01M 50/152* (2021.01);
(Continued)

(58) Field of Classification Search
CPC ............ H01M 50/107; H01M 50/147; H01M 50/152; H01M 50/159; H01M 50/166;
(Continued)

(56) References Cited

U.S. PATENT DOCUMENTS 5,750,277 A * 5/1998 Vu ..................... H01M 50/581 429/61
6,524,739 B1 * 2/2003 Iwaizono ............ H01M 50/562 429/185
(Continued)

FOREIGN PATENT DOCUMENTS

CN 1564340 1/2005
JP S5813664 1/1983
(Continued)

OTHER PUBLICATIONS

"Notice of Reasons for Refusal of Japan Counterpart Application", issued on Dec. 23, 2025, with English translation thereof, p. 1-p. 12.
(Continued)

*Primary Examiner* — Brian K Talbot
(74) *Attorney, Agent, or Firm* — JCIPRNET

(57) ABSTRACT

A sealing body and a cylindrical storage battery are provided. The sealing body includes: a first cover plate fixed to the battery; a second cover plate forming a housing space between itself and first cover plate; and an elastic valving element disposed inside housing space and compressed between the first and second cover plate. The first cover plate includes an annular, hollow disk-shaped base portion around an axis line, an annular first sidewall portion extending downward from an inner peripheral edge portion of the base portion, and a bottom wall portion connected to the first sidewall portion. The first sidewall portion has a first through-hole passing through the first sidewall portion in a direction approaching axis line. The second cover plate has a communicating hole communicating housing space and an
(Continued)

external space. The valving element is disposed between the first through-hole and the communicating hole in direction of fluid flow.

4 Claims, 3 Drawing Sheets

(51) Int. Cl.

| | |
|---|---|
| ***H01M 50/152*** | (2021.01) |
| *H01M 10/04* | (2006.01) |
| *H01M 50/147* | (2021.01) |
| *H01M 50/159* | (2021.01) |
| *H01M 50/166* | (2021.01) |
| *H01M 50/171* | (2021.01) |
| *H01M 50/183* | (2021.01) |
| *H01M 50/186* | (2021.01) |
| *H01M 50/317* | (2021.01) |

(52) U.S. Cl.
CPC .......... *H01M 10/04* (2013.01); *H01M 50/147* (2021.01); *H01M 50/159* (2021.01); *H01M 50/166* (2021.01); *H01M 50/171* (2021.01); *H01M 50/183* (2021.01); *H01M 50/186* (2021.01); *H01M 50/317* (2021.01); *H01M 2200/20* (2013.01)

(58) Field of Classification Search
CPC ............. H01M 50/171; H01M 50/183; H01M 50/186; H01M 50/317; H01M 50/325; H01M 2200/20; H01M 10/04
USPC ............................................................ 429/55
See application file for complete search history.

(56) References Cited

U.S. PATENT DOCUMENTS

| | | | | |
|---|---|---|---|---|
| 7,629,076 | B2 * | 12/2009 | Miyahisa | H01M 50/186 429/185 |
| 8,263,242 | B2 * | 9/2012 | Yebka | H01M 50/325 429/82 |
| 8,481,183 | B2 * | 7/2013 | Kim | H01M 50/147 429/7 |
| 9,692,038 | B2 * | 6/2017 | Tsuruta | H01M 50/167 |
| 10,020,146 | B2 * | 7/2018 | Okuda | H01H 35/26 |
| 10,615,401 | B2 * | 4/2020 | Kunoike | H01M 10/0587 |
| 10,734,625 | B2 * | 8/2020 | Tsang | H01M 50/152 |
| 11,695,179 | B2 * | 7/2023 | Bae | H01M 50/152 429/179 |
| 12,046,772 | B2 * | 7/2024 | Chun | H01M 50/578 |
| 2010/0112434 | A1 * | 5/2010 | Akou | H01M 50/534 429/174 |
| 2011/0076527 | A1 * | 3/2011 | Kim | H01M 50/166 429/53 |
| 2016/0285071 | A1 * | 9/2016 | Fukuoka | H01M 50/383 |
| 2018/0047973 | A1 * | 2/2018 | Kunoike | H01M 10/0587 |
| 2018/0287104 | A1 * | 10/2018 | Urushihara | H01M 50/188 |
| 2018/0301672 | A1 * | 10/2018 | Aoki | H01M 10/0422 |
| 2020/0136097 | A1 * | 4/2020 | Yamaguchi | H01M 50/152 |

FOREIGN PATENT DOCUMENTS

| | | |
|---|---|---|
| JP | S60131965 | 9/1985 |
| JP | 2000149918 | 5/2000 |
| JP | 2019114472 | 7/2019 |
| WO | 0011737 | 3/2000 |
| WO | 2020171112 | 8/2020 |

OTHER PUBLICATIONS

"International Search Report (Form PCT/ISA/210) of PCT/JP2021/045794", mailed on Mar. 8, 2022, with English translation thereof, pp. 1-4.

* cited by examiner

SEALING BODY FOR CYLINDRICAL STORAGE BATTERY AND CYLINDRICAL STORAGE BATTERY USING SAME

CROSS-REFERENCE TO RELATED APPLICATION

This application is a 371 application of the International PCT application serial no. PCT/JP2021/045794, filed on Dec. 13, 2021, which claims the priority benefits of Japan Patent Application No. 2021-006338, filed on Jan. 19, 2021. The entirety of each of the above-mentioned patent applications is hereby incorporated by reference herein and made a part of this specification.

TECHNICAL FIELD

The present invention relates to a sealing body for a cylindrical storage battery, and a cylindrical storage battery using the same.

RELATED ART

Conventionally, secondary batteries equipped with a safety valve for releasing gas filled in the battery when the internal pressure of the battery increases due to overcharging are known. For example, the secondary battery described in Patent Literature 1 is configured in such a way that a power generating element is housed in a battery case formed in a bottomed cylindrical shape, a sealing plate is fixed on an opening end side of the battery case through an outer gasket by crimping, and the opening end of the battery case is sealed.

In the secondary battery described in Patent Literature 1, the sealing plate is configured by arranging a sealing bottom plate, a lower metal thin plate, an upper metal thin plate, a PTC element, a substrate support plate, and a circuit board in order from the inside of the battery. The lower metal thin plate and the upper metal thin plate are provided with a function as an exhaust valve for gas generated in the battery. In other words, when the internal pressure of the battery abnormally increases due to the decomposition of the electrolyte caused by abnormal use, the internal pressure of the battery extends to the lower metal thin plate through the opening formed in the sealing bottom plate and deforms the lower metal thin plate and the upper metal thin plate toward the outside of the battery. Then, when the lower metal thin plate and the upper metal thin plate rupture, there is nothing to shield between the inside of the battery and the inside of the sealing plate, so gas is released outside through the exhaust hole formed in the substrate support plate.

PATENT LITERATURE

[Patent Literature 1] Patent Literature 1: Japanese Patent Application Laid-Open No. 2000-149918

SUMMARY OF INVENTION

Technical Problem

In recent years, the demand for nickel-hydrogen batteries has been increasing due to reasons such as their large capacity and clean performance. In order to achieve a larger capacity for nickel-hydrogen batteries, for example, the number of turns of the spiral electrode group may be increased to increase the opposing area between the positive electrode plate and the negative electrode plate. When the number of turns of the spiral electrode group is increased in this way, short circuits due to direct contact between the negative electrode plate and the positive electrode plate easily occur, and the contents inside the battery case (e.g. separators) may melt due to abnormal heat generation accompanying the short circuit. Such melted contents are usually released externally along with gas.

However, in the secondary battery described in Patent Literature 1, the opening is formed in the sealing bottom plate facing the vertical direction (the direction parallel to the battery axis line), so there is a possibility that a large amount of melted contents may flow into the opening and clog it. In particular, since there are more contents (e.g. excess separators) in the inner peripheral region of the spiral electrode group, a particularly large amount of contents may flow into the opening formed at the center of the sealing bottom plate, and the opening may be clogged. When the opening is clogged by such melted contents, the gas filled by the charge-discharge cycle cannot be released, and consequently, the increased internal pressure cannot not be lowered, which may lead to situations such as battery rupture.

The present invention has been made in view of such problems, and its object is to provide a sealing body for a cylindrical storage battery that suppresses clogging by battery contents and improves battery safety, and a cylindrical storage battery using the same.

Problem Solution

The sealing body is a sealing body for a cylindrical storage battery and includes a first cover plate fixed to the cylindrical storage battery; a second cover plate fixed to an upper surface of the first cover plate and forming a housing space between itself and the first cover plate; and an elastic valving element disposed inside the housing space and compressed between the first cover plate and the second cover plate. The first cover plate includes a hollow disk-shaped base portion formed annularly around an axis line of the cylindrical storage battery, a first sidewall portion extending downward from an inner peripheral edge portion of the base portion and formed annularly around the axis line; and a bottom wall portion connected to a lower edge portion of the first sidewall portion. The first sidewall portion has at least one first through-hole passing through an outer peripheral side surface and an inner peripheral side surface of the first sidewall portion in a direction approaching the axis line. The second cover plate has a communicating hole in at least a portion of the second cover plate for communicating the housing space and an external space. The valving element is disposed between the first through-hole and the communicating hole in the direction of fluid flow.

In the sealing body according to one embodiment of the present invention, the first through-hole is formed in a vertical direction with respect to the axis line.

In the sealing body according to one embodiment of the present invention, the bottom wall portion is formed in a hollow disk shape, formed annularly around the axis line. The first cover plate includes a second sidewall portion extending upward from an inner peripheral edge portion of the bottom wall portion and formed annularly around the axis line, and a ceiling wall portion connected to an upper edge portion of the second sidewall portion. The second sidewall portion has at least one second through-hole passing through an outer peripheral side surface and an inner peripheral side surface of the second sidewall portion in the direction approaching the axis line. The valving element is disposed between the second through-hole and the communicating hole in the direction of fluid flow.

In the sealing body according to one embodiment of the present invention, the second through-hole is formed in the vertical direction with respect to the axis line.

Furthermore, the cylindrical storage battery according to the present invention includes a spiral electrode group formed by spirally stacking a strip-shaped positive electrode plate, a strip-shaped negative electrode plate, and a strip-shaped separator disposed between the positive electrode plate and the negative electrode plate; a conductive outer can having a bottomed cylindrical shape with an opening on one side, in which the spiral electrode group is housed together with an electrolyte; a positive electrode terminal electrically connected to the positive electrode plate; and a sealing body as described above, fixed to the outer can so as to seal the opening of the outer can.

Effects of Invention

According to the sealing body and cylindrical storage battery of the present invention, the first sidewall portion has at least one first through-hole penetrating in the direction approaching the axis line between the outer peripheral side surface and the inner peripheral side surface of the first sidewall portion, and the second cover plate has a communicating hole in at least a portion of the second cover plate for communicating the housing space and the external space, and the valving element is disposed between the first through-hole and the communicating hole in the direction of fluid flow. In this way, the first through-hole of the sealing body is provided at a position away from the axis line of the cylindrical storage battery, that is, at a position away from the central region of the cylindrical battery, and is formed in a direction approaching the axis line, that is, not parallel to the axis line. Thus, even if the contents (e.g. separator) in the spiral electrode group melt due to abnormal heat generation caused by a short circuit in the storage battery, it is possible to avoid a situation where the first through-hole is clogged by the contents. In particular, since the first through-hole is provided at a position away from the inner peripheral side region of the spiral electrode group where melted contents are likely to accumulate, even if contents melt in the inner peripheral side region of the spiral electrode group where more contents (e.g. excess separators) exist, it is possible to avoid a situation where the first through-hole is clogged by the contents. Thus, even if abnormal heat is generated due to a short circuit, it is possible to discharge melted contents to an external space through the first through-hole, housing space, and communicating hole, and thereby discharge gas inside the storage battery to an external space. Thus, it is possible to avoid situations such as rupture of the storage battery and improve safety of the storage battery.

DESCRIPTION OF EMBODIMENTS

In the following, an embodiment of a sealing body 11 for a nickel-hydrogen secondary battery 2 (hereinafter, simply referred to as "battery 2") as a sealing body for a cylindrical storage battery according to one embodiment, and an embodiment of the battery 2 with the sealing body 11 mounted thereon will be described. Although the present embodiment describes an AA size cylindrical battery 2, the size of the battery 2 is not limited thereto, and other sizes such as AAA size may be applied. Also, as long as the cylindrical storage battery uses an alkaline solution as the electrolyte, it may be, for example, a nickel-cadmium storage battery.

Figure 1:
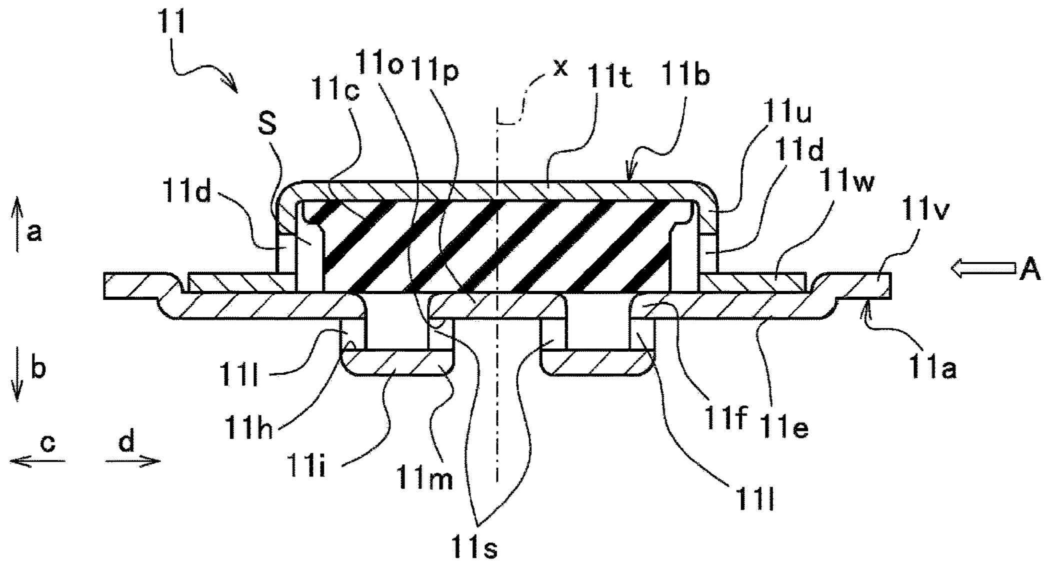
FIG. 1 is a cross-sectional view of a sealing body for a cylindrical storage battery according to one embodiment.
Figure 2:
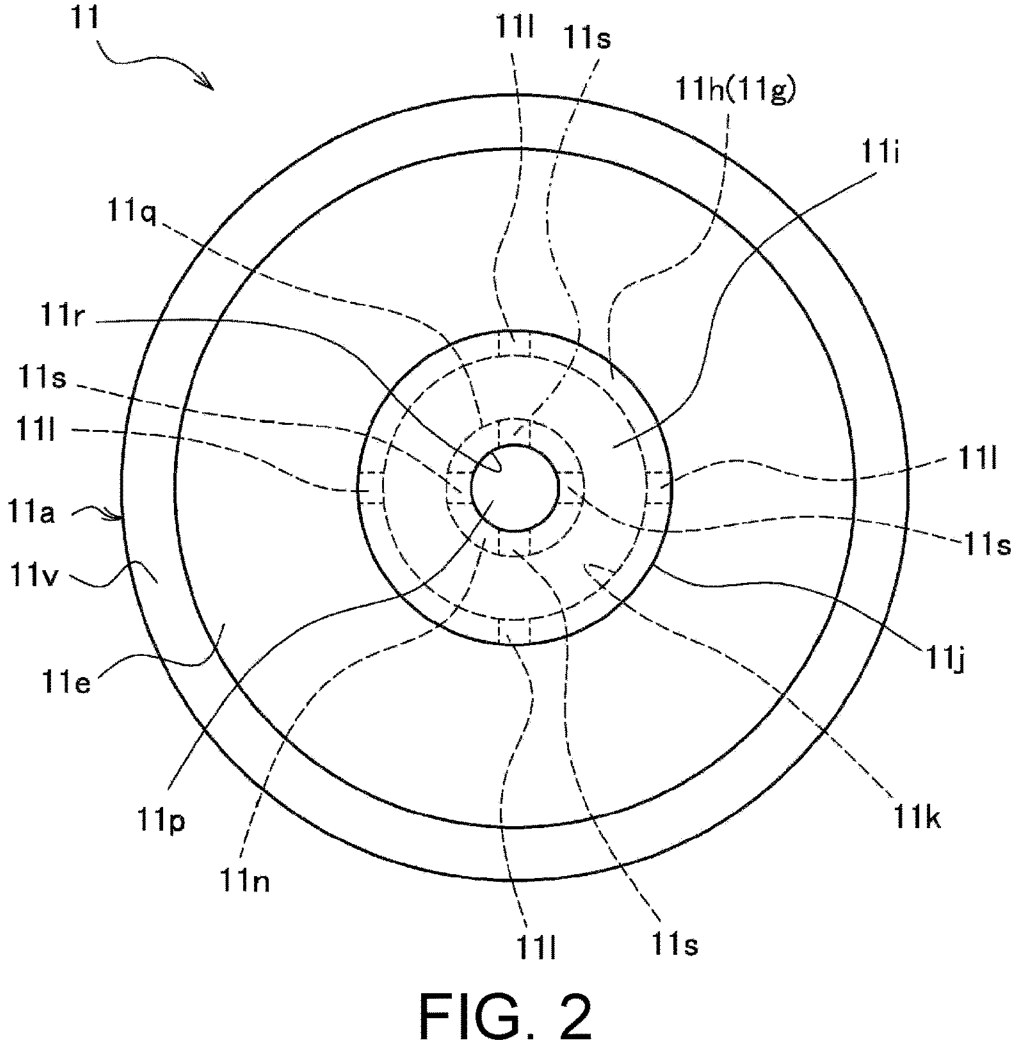
FIG. 2 is a bottom view of the sealing body of FIG. 1 as viewed from below.
Figure 3:
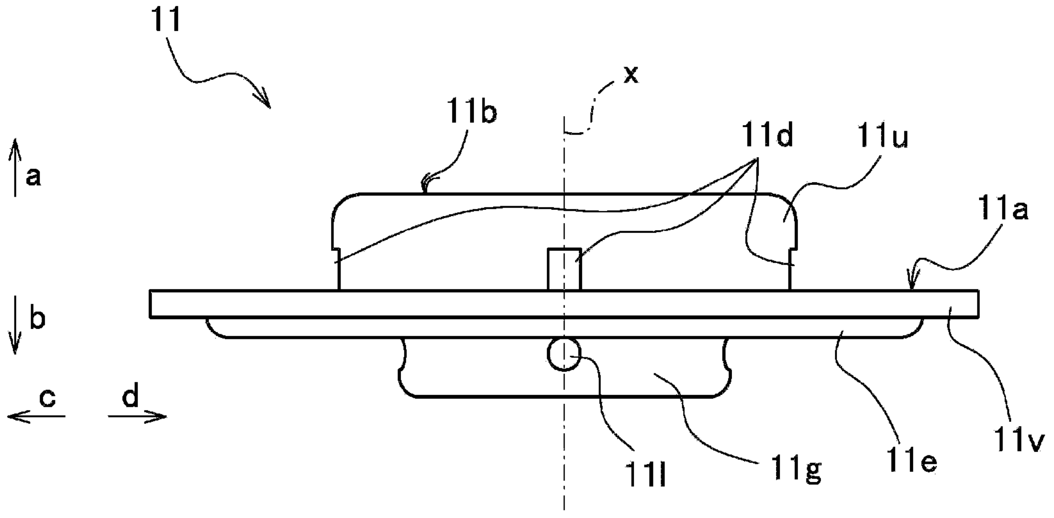
FIG. 3 is a side view of the sealing body of FIG. 1 as viewed from an arrow A direction.
Figure 4:
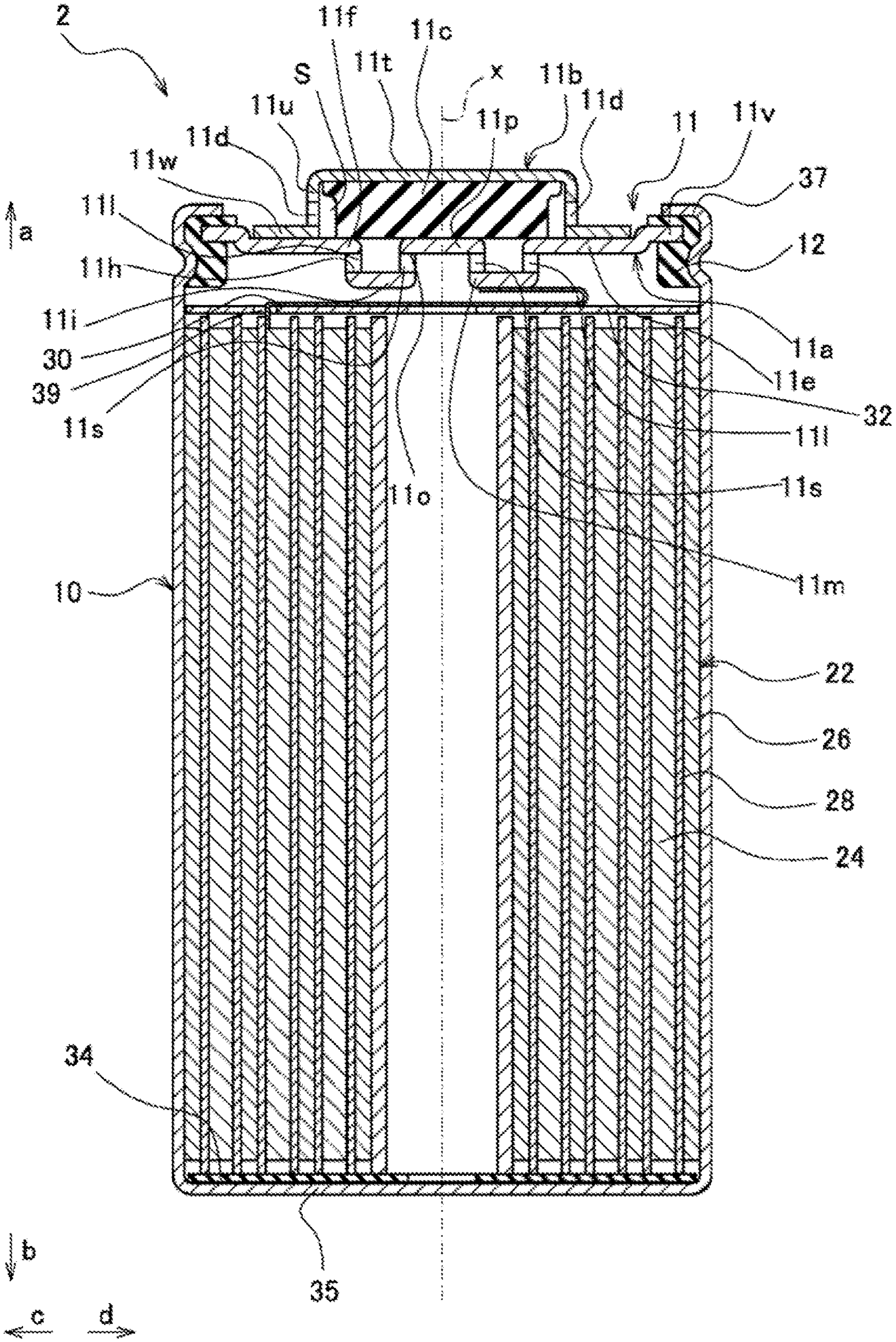
FIG. 4 is a cross-sectional view of a cylindrical storage battery with the sealing body of FIG. 1 mounted thereon.

FIG. 1 is a cross-sectional view of the sealing body 11 for the nickel-hydrogen secondary battery 2 (cylindrical storage battery) according to one embodiment. FIG. 2 is a bottom view of the sealing body 11 of FIG. 1 as viewed from below. FIG. 3 is a side view of the sealing body 11 of FIG. 1 as viewed from an arrow A direction. FIG. 4 is a cross-sectional view of the battery 2 with the sealing body 11 of FIG. 1 mounted thereon. For convenience of explanation, as shown in FIG. 4, in an axis line x of a cylindrical outer can 10, an arrow a direction is referred to as the upper side, and an arrow b direction is referred to as the lower side. Here, the upper side refers to the side where the sealing body 11 is provided in the battery 2, and the lower side refers to the side where a bottom wall 35 is provided in the battery 2, and is the opposite side of the upper side. Also, in a direction perpendicular to the axis line x (hereinafter also referred to as "radial direction"), a direction away from the axis line x is defined as the outer peripheral side (arrow c direction), and a direction approaching the axis line x is defined as the inner peripheral side (arrow d direction).

As shown in FIG. 4, the battery 2 is provided with the outer can 10 having a bottomed cylindrical shape with an opening on the upper side (arrow a direction). The outer can 10 of the battery 2 has an annular cylindrical shape around the axis line x extending in the vertical direction. The outer can 10 is conductive, and the bottom wall 35 provided on the lower side (arrow b direction) functions as a negative electrode terminal. The sealing body 11 is fixed to the opening of the outer can 10, and the sealing body 11 is used for sealing the outer can 10 of the battery 2.

As shown in FIGS. 1 to 3, the sealing body 11 is provided with a first cover plate 11*a*, a second cover plate 11*b*, and an elastic valving element 11*c*.

The first cover plate 11*a* is a conductive member integrally formed with a base portion 11*e*, a first sidewall portion 11*g*, and a bottom wall portion 11*i*, and is configured with the same or substantially the same plate thickness as a whole. The base portion 11*e* of the first cover plate 11*a* is a hollow disk-shaped portion formed annularly around the axis line x of the battery 2. The first cover plate 11*a* includes a fixed portion 11*v*, which is a plate-shaped portion extending further in the outer peripheral direction from the outer peripheral end portion of the base portion 11*e*. The fixed portion 11*v* is formed annularly around the axis line x.

The first sidewall portion 11*g* of the first cover plate 11*a* extends downward from an inner peripheral edge portion 11*f* of the base portion 11*e* and is formed annularly around the axis line x. The first sidewall portion 11*g* has at least one first through-hole 11*l* penetrating in the direction approaching the axis line x between an outer peripheral side surface 11*j* and an inner peripheral side surface 11*k* of the first sidewall portion 11*g*. Specifically, the first through-hole 11*l* is formed in a vertical direction with respect to the axis line x. Also, as shown in FIG. 2, four first through-holes 11*l* are formed in the first sidewall portion 11*g* at equal intervals (90° intervals).

The bottom wall portion 11*i* of the first cover plate 11*a* is connected to a lower edge portion 11*h* of the first sidewall portion 11*g*. The bottom wall portion 11*i* is formed in a hollow disk shape formed annularly around the axis line x. And, the first cover plate 11*a* is configured to include a second sidewall portion 11*n* extending upward from an inner peripheral edge portion 11*m* of the bottom wall portion 11*i* and formed annularly around the axis line x, and a ceiling wall portion 11*p* connected to an upper edge portion 11*o* of the second sidewall portion 11*n*.

As shown in FIGS. 1 to 3, the second sidewall portion 11*n* has at least one second through-hole 11*s* penetrating in the direction approaching the axis line x between an outer peripheral side surface 11*q* and an inner peripheral side surface 11*r* of the second sidewall portion 11*n*. Specifically, the second through-hole 11*s* is formed in a vertical direction with respect to the axis line x. Also, as shown in FIG. 2, four second through-holes 11*s* are formed in the second sidewall portion 11*n* at equal intervals (90° intervals). Each of the second through-holes 11*s* is arranged in alignment with each of the first through-holes 11*l* in the radial direction.

As shown in FIG. 1, the second cover plate 11*b* is an integrally formed conductive member including a hollow disk-shaped flange portion 11*w* formed annularly around the axis line x of the battery 2, a connection portion 11*u* formed annularly around the axis line x and extending upward from the inner peripheral edge portion of the flange portion 11*w*, and a pressing portion 11*t* connected to the upper edge portion of the connection portion 11*u*, and is configured with the same or substantially the same plate thickness as a whole.

The second cover plate 11*b* is fixed to the upper surface of the base portion 11*e* of the first cover plate 11*a* at the flange portion 11*w*, and forms a housing space S between itself and the first cover plate 11*a*. The second cover plate 11*b* is made of a metal member and is electrically connected to the metal first cover plate 11*a*. The second cover plate 11*b* has a communicating hole 11*d* in at least a portion of the second cover plate 11*b* for communicating the housing space S and the external space. Specifically, the communicating hole 11*d* is formed to penetrate through the outer peripheral side surface and inner peripheral side surface of the connection portion 11*u* of the second cover plate 11*b* in a direction approaching the axis line x. More specifically, the communicating hole 11*d* is formed in a vertical direction with respect to the axis line x. Furthermore, four communicating holes 11*d* are formed in the connection portion 11*u* at equal intervals (90° intervals).

As shown in FIG. 1, the valving element 11*c* is made of rubber, is compressed between the first cover plate 11*a* and the second cover plate 11*b*, and is disposed inside the housing space S. Specifically, the valving element 11*c* is in contact with the upper surface of the base portion 11*e* and the upper surface of the ceiling wall portion 11*p*, and is pressed by the pressing portion 11*t* of the second cover plate 11*b* to the base portion 11*e* and the ceiling wall portion 11*p*. As shown in FIG. 1 and FIG. 4, the valving element 11*c* is disposed between the first through-hole 11*l* and the communicating hole 11*d* in the direction of fluid flow. Moreover, the valving element 11*c* may be disposed between the second through-hole 11*s* and the communicating hole 11*d* in the direction of fluid flow. The direction of fluid flow refers to the direction from the inside of the outer can 10 approaching the external space of the battery 2, and the flow direction of melted contents and gas.

As shown in FIG. 4, inside the opening of the outer can 10, the first cover plate 11*a* and a ring-shaped insulating packing 12 surrounding this first cover plate 11*a* are disposed, and the insulating packing 12 is fixed to an opening edge 37 of the outer can 10 by crimping the opening edge 37 of the outer can 10. In other words, the first cover plate 11*a* and the insulating packing 12 cooperate with each other to hermetically clog the opening of the outer can 10.

Under normal conditions, the first through-hole 11*l* and the second through-hole 11*s* are hermetically clogged by the valving element 11*c*, and communication between them and the communicating hole 11*d* of the second cover plate 11*b* is cut off. On the other hand, when gas is generated inside the outer can 10 and the pressure of the gas increases, the valving element 11*c* is compressed upward by the pressure of the gas, opening the first through-hole 11*l* and the second through-hole 11*s*. As a result, gas is released from inside the outer can 10 to the outside through the first through-hole 11*l*, the second through-hole 11*s*, and the communicating hole 11*d* of the second cover plate 11*b*. In other words, the first through-hole 11*l*, the second through-hole 11*s*, the communicating hole 11*d* of the second cover plate 11*b*, and the valving element 11*c* form a safety valve for the battery 2.

As shown in FIG. 4, a spiral electrode group 22 is housed in the outer can 10. The spiral electrode group 22 is formed by stacking a strip-shaped positive electrode plate 24, a strip-shaped negative electrode plate 26, and a strip-shaped separator 28 on top of each other. The spiral electrode group 22 is formed in a spiral shape with the separator 28 sandwiched between the positive electrode plate 24 and the negative electrode plate 26. In other words, the positive electrode plate 24 and the negative electrode plate 26 are stacked on top of each other through the separator 28.

In the outer can 10, a positive pole lead 30 is arranged between the upper end of the spiral electrode group 22 and the first cover plate 11*a*. Specifically, one end of the positive pole lead 30 is connected to the positive electrode plate 24, and the other end is connected to the first cover plate 11*a*. Thus, the second cover plate 11*b* and the positive electrode plate 24 are electrically connected to each other through the positive pole lead 30 and the first cover plate 11*a*. A circular upper insulating member 32 is disposed between the first cover plate 11*a* and the spiral electrode group 22, and the positive pole lead 30 extends through a slit 39 provided in the upper insulating member 32. Moreover, a circular lower insulating member 34 is also disposed between the spiral electrode group 22 and the bottom wall 35 of the outer can 10.

Furthermore, a predetermined amount of alkaline electrolyte (not shown) is injected into the outer can 10. This alkaline electrolyte impregnates the spiral electrode group 22 and promotes electrochemical reactions (charge-discharge reactions) during charging and discharging between the positive electrode plate 24 and the negative electrode plate 26. As the alkaline electrolyte, it is preferable to use an aqueous solution containing at least one of KOH, NaOH, and LiOH as a solute.

As the material for the separator 28, for example, a material obtained by adding a hydrophilic functional group to a non-woven fabric made of polyamide fibers, or a material obtained by adding a hydrophilic functional group to a non-woven fabric made of polyolefin fibers such as polyethylene and polypropylene.

The positive electrode plate 24 includes a conductive positive electrode substrate having a porous structure and a positive electrode mixture held in the pores of the positive electrode substrate. As such a positive electrode substrate, for example, a foamed nickel sheet may be used. The positive electrode mixture includes positive electrode active material particles and a binding agent. Moreover, a positive electrode additive is added to the positive electrode mixture as needed.

The negative electrode plate 26 includes a metal negative electrode core, and a negative electrode active material-containing negative electrode mixture layer supported by the negative electrode core, and is strip-shaped as a whole. The negative electrode core is conductive. The negative electrode mixture layer is formed on both sides of the negative electrode core. The negative electrode mixture layer is formed by a negative electrode mixture containing a negative electrode active material. The negative electrode mixture not only fills the through-hole of the negative electrode core but also layered on both sides of the negative electrode core to form a negative electrode mixture layer. The negative electrode mixture includes hydrogen storage alloy particles capable of absorbing and releasing hydrogen as a negative electrode active material, a conductive agent, a binding agent, and a negative electrode auxiliary agent.

The positive electrode plate 24 and the negative electrode plate 26 are wound in a spiral shape with the separator 28 interposed therebetween, forming the spiral electrode group 22. The obtained spiral electrode group 22 is housed in the outer can 10. Subsequently, a predetermined amount of alkaline electrolyte is injected into the outer can 10. Then, the outer can 10 housing the spiral electrode group 22 and the alkaline electrolyte is sealed by the sealing body 11 provided with the first cover plate 11*a*, and the battery 2 according to one embodiment is obtained. The battery 2 undergoes an initial activation treatment and is made available for use.

Next, the operation and effects of the sealing body 11 and the battery 2 according to one embodiment will be described. As described above, in the sealing body 11 and the battery 2 according to one embodiment, the first sidewall portion 11*g* has at least one first through-hole 11*l* penetrating in the direction approaching the axis line x between the outer peripheral side surface 11*j* and inner peripheral side surface 11*k* of the first sidewall portion 11*g*, the second cover plate 11*b* has the communicating hole 11*d* in at least a portion of the second cover plate 11*b* for communicating the housing space S and the external space, and the valving element 11*c* is disposed between the first through-hole 11*l* and the communicating hole 11*d* in the direction of fluid flow. In this way, the first through-hole 11*l* of the sealing body 11 is provided at a position away from the axis line x of the battery 2, that is, at a position away from the central region of the battery 2, and is formed in a direction approaching the axis line x, that is, non-parallel to the axis line x. Thus, even when the contents (for example, separator 28) in the spiral electrode group 22 are melted due to abnormal heat generation caused by short-circuiting in the battery 2, it is possible to avoid a situation where the first through-hole 11*l* is clogged by the contents. In particular, since the first through-hole 11*l* is provided at a position away from the inner peripheral side region where molten contents are likely to accumulate in the spiral electrode group, even when contents are melted in the inner peripheral side region of the spiral electrode group 22 where more contents (for example, excess separator 28) exist, it is possible to avoid a situation where the first through-hole 11*l* is clogged by the contents. Thus, even when abnormal heat is generated due to short-circuiting, the molten contents may be discharged to an external space through the first through-hole 11*l*, the housing space S, and the communicating hole 11*d*, and thus the gas in the battery 2 may be discharged to an external space. As a result, it is possible to avoid situations such as rupture of the battery 2 and improve the safety of the battery 2.

In one embodiment, according to the sealing body 11 and the battery 2, the first through-hole 11*l* is formed in a vertical direction with respect to the axis line x. In this way, the first through-hole 11*l* does not open in the direction in which the spiral electrode group 22 is arranged in the battery 2, that is, in the downward direction (arrow b direction). Thus, it is possible to avoid a situation where a large amount of molten contents flow into the first through-hole 11*l* and a situation where the first through-hole 11*l* is clogged by the contents. As a result, even when abnormal heat is generated due to a short circuit, it is possible to discharge the molten contents to an external space through the first through-hole 11*l*, the housing space S, and the communicating hole 11*d*, and consequently, it is possible to discharge the gas inside the battery 2 to an external space.

Moreover, in the sealing body 11 and the battery 2 according to one embodiment, the second sidewall portion 11*n* has at least one second through-hole 11*s* penetrating in the direction approaching the axis line x between the outer peripheral side surface 11*q* and the inner peripheral side surface 11*r* of the second sidewall portion 11*n*. Further, the valving element 11*c* is disposed between the second through-hole 11*s* and the communicating hole 11*d* in the direction of fluid flow. In this way, the second through-hole 11*s* of the sealing body 11 is provided at a position away from the axis line x of the battery 2, that is, at a position away from the central region of the battery 2, and is formed in a direction approaching the axis line x, that is, non-parallel to the axis line x. Thus, even when the contents (for example, separator 28) in the spiral electrode group 22 are melted due to abnormal heat generation caused by a short circuit in the battery 2, it is possible to avoid a situation where the second through-hole 11*s* is clogged by the contents. Furthermore, since the sealing body 11 has the second through-hole 11*s* formed in addition to the first through-hole 11*l*, even when the contents are melted in the inner peripheral region of the spiral electrode group 22 where more contents (for example, excess separator 28) exist, it is possible to discharge the contents to an external space by dispersing them into both the first through-hole 11*l* and the second through-hole 11*s*. Thus, even when abnormal heat is generated due to a short circuit, it is possible to discharge melted contents to an external space through the first through-hole 11*l*, the second through-hole 11*s*, the housing space S, and the communicating hole 11*d*, and thus it is possible to discharge gas inside the battery 2 to an external space.

Moreover, in the sealing body 11 and the battery 2 according to one embodiment, the second through-hole 11*s* is formed in a vertical direction with respect to the axis line x. In this way, the second through-hole 11*s* does not open in the direction where the spiral electrode group 22 is disposed inside the battery 2, that is, in the downward direction (arrow b direction). Thus, it is possible to avoid a situation where a large amount of molten contents flow into the second through-hole 11*s* and avoid a situation where the second through-hole 11*s* is clogged by the contents. Thus, even when abnormal heat is generated due to a short circuit, it is possible to discharge the molten contents to an external space through the second through-hole 11*s*, the housing space S, and the communicating hole 11*d*, and consequently, it is possible to discharge gas inside the battery 2 to an external space.

EXAMPLE

For evaluating the performance of the battery 2 according to one embodiment, a cylindrical storage battery with a height of 50 mm and an outer diameter of 14 mm was fabricated. In the present example, the sealing body 11 (with four first through-holes 11*l* and four second through-holes 11*s*, respectively) as shown in FIGS. 1 to 3 was prepared, and the battery 2 as shown in FIG. 4 with the sealing body 11 mounted thereon was fabricated. In contrast, as a comparative example, a sealing body having only one hole penetrating the base portion in the vertical direction at the center of the base portion was prepared, and a battery with the sealing body mounted thereon was fabricated. Thus, in the battery of the comparative example, only a through-hole parallel to the axis line x are formed, and no holes penetrating in the direction approaching the axis line x like the sealing body 11 of the present example are formed. The battery of the comparative example has the same configuration as that of the battery 2 of the present example except for the different configuration of the sealing body. Ten cells each of such battery 2 of the present example and the battery of the comparative example were manufactured, and burner tests were conducted to attempt to reproduce a state where heat generation occurred inside the batteries. The burner test is a test specified in UL standards (UL2054:2004 Clause 22), so a detailed description of its method is omitted. As a result, in the battery 2 according to the present example, both the number of ruptures and deformations were zero. Thus, it was confirmed that in the battery 2 of the present example, even when heat generation occurred inside the battery, molten contents were discharged into external space, and consequently, gas inside the battery 2 was discharged into external space. On the other hand, in the battery according to the comparative example, although there were no ruptures, four out of ten cells had deformations. Thus, it was confirmed that in the battery according to the comparative example, gas inside the battery could not be properly discharged into external space when heat generation occurred inside the battery.

The above description has been given for preferred embodiments of the present invention, but the present invention is not limited to the sealing body 11 and the nickel-hydrogen secondary battery 2 according to the above embodiments, and includes all aspects within the concept and scope of the patent claims of the present invention, and various configurations may be appropriately selectively combined. Furthermore, the shape, material, arrangement, size, etc. of each component in the above embodiments may be appropriately changed depending on the specific embodiment of the present invention.

For example, in the above embodiment, it has been described that the bottom wall portion 11*i* of the first cover plate 11*a* is formed in a hollow disk shape. However, the bottom wall portion 11*i* may be formed without having a through-hole penetrating in the vertical direction. In this case, the first cover plate 11*a* does not have the second sidewall portion 11*n* and the ceiling wall portion 11*p*, and is generally formed in a cup shape that is concave downward.

In the above embodiment, it has been described that the first through-hole 11*l*, the second through-hole 11*s*, and the communicating hole 11*d* are formed in a vertical direction with respect to the axis line x. However, the first through-hole 11*l*, the second through-hole 11*s*, and the communicating hole 11*d* may be formed obliquely with respect to the axis line x. Moreover, in the above embodiment, it has been described that four first through-hole 11*l*, the second through-hole 11*s*, and the communicating hole 11*d* are each formed at equal angles (90°) in the first sidewall portion 11*g*, the second sidewall portion 11*n*, and the connection portion 11*u*. However, the number and position of the first sidewall portion 11*g*, the second sidewall portion 11*n*, and the connection portion 11*u* are not limited thereto and may be appropriately changed.

In the above embodiment, it has been described that each of the second through-holes 11*s* is arranged in alignment with each of the first through-holes 11*l* in the radial direction. However, the positional relationship between the second through-hole 11*s* and the first through-hole 11*l* is not limited thereto, and for example, the second through-hole 11*s* and the first through-hole 11*l* may be formed offset from each other in the radial direction.

In the above embodiment, it has been described that the valving element 11*c* is made of rubber and is arranged in a compressed state in the housing space S. However, the configuration of the valving element 11*c* is not limited thereto, and for example, a compression spring may be attached to the second cover plate 11*b*, and an iron plate and a rubber plate may be mounted on the tip of the compression spring. Since the configuration of such a valving element is well known, a detailed description thereof is omitted.

What is claimed is:

1. A sealing body for a cylindrical storage battery, comprising:

a first cover plate fixed to the cylindrical storage battery;

a second cover plate fixed to an upper surface of the first cover plate and forming a housing space between itself and the first cover plate; and an elastic valving element disposed inside the housing space and compressed between the first cover plate and the second cover plate, wherein the first cover plate comprises a hollow disk-shaped base portion formed annularly around an axis line of the cylindrical storage battery, a first sidewall portion extending downward from an inner peripheral edge portion of the base portion and formed annularly around the axis line, a bottom wall portion connected to a lower edge portion of the first sidewall portion and formed in a hollow disk shape, annularly formed around the axis line, a second sidewall portion extending upward from an inner peripheral edge portion of the bottom wall portion and formed annularly around the axis line, and a ceiling wall portion connected to an upper edge portion of the second sidewall portion;

the first sidewall portion has at least one first through-hole passing through an outer peripheral side surface and an inner peripheral side surface of the first sidewall portion in a direction approaching the axis line;

the second cover plate has a communicating hole in at least a portion of the second cover plate for communicating the housing space and an external space;

the valving element is disposed between the at least one first through-hole and the communicating hole in a direction of fluid flow;

the second sidewall portion has at least one second through-hole passing through an outer peripheral side surface and an inner peripheral side surface of the at least one second sidewall portion in the direction approaching the axis line; and the valving element is further disposed between the at least one second through-hole and the communicating hole in the direction of fluid flow.

2. The sealing body according to claim 1, wherein the at least one first through-hole is formed in a vertical direction with respect to the axis line.

3. The sealing body according to claim 1, wherein the at least one second through-hole is formed in the vertical direction with respect to the axis line.

4. A cylindrical storage battery, comprising:

a spiral electrode group formed by spirally stacking a strip-shaped positive electrode plate, a strip-shaped negative electrode plate, and a strip-shaped separator disposed between the positive electrode plate and the negative electrode plate;

a conductive outer can having a bottomed cylindrical shape with an opening on one side, in which the spiral electrode group is housed together with an electrolyte;

a positive electrode terminal electrically connected to the positive electrode plate; and a sealing body according to claim 1, wherein the sealing body is fixed to the outer can so as to seal the opening of the outer can.

* * * * *